June 6, 1961 F. KRAHULEC 2,987,320

RECORD CHANGING PHONOGRAPH

Filed Nov. 5, 1959 4 Sheets-Sheet 1

INVENTOR.
Fred Krahulec
BY Hofgren, Brady, Wegner, Allen & Stellman
Attys

June 6, 1961 F. KRAHULEC 2,987,320

RECORD CHANGING PHONOGRAPH

Filed Nov. 5, 1959 4 Sheets-Sheet 2

INVENTOR.
Fred Krahulec
BY Hofgren, Brady,
Wegner, Allen & Stellman
Attys.

June 6, 1961 F. KRAHULEC 2,987,320

RECORD CHANGING PHONOGRAPH

Filed Nov. 5, 1959 4 Sheets-Sheet 3

INVENTOR.
Fred Krahulec
BY Hofgren, Brady,
Wegner, Allen & Stellman
Attys.

June 6, 1961 F. KRAHULEC 2,987,320

RECORD CHANGING PHONOGRAPH

Filed Nov. 5, 1959 4 Sheets-Sheet 4

INVENTOR.
Fred Krahulec
BY Hofgren, Brady,
Wegner, Allen & Stellman
Attys.

United States Patent Office 2,987,320
Patented June 6, 1961

2,987,320
RECORD CHANGING PHONOGRAPH
Fred Krahulec, Skokie, Ill., assignor to Warwick Manufacturing Corporation, a corporation of Delaware
Filed Nov. 5, 1959, Ser. No. 851,083
7 Claims. (Cl. 274—10)

This invention relates to a phonograph and more particularly to a record changing phonograph with mechanism for quickly unstacking a stack of records threaded on a spindle by repetitive drop of records to the turntable.

An object of this invention is to provide new and improved unstacking mechanism for a record changing phonograph.

Another object of the invention in a phonograph having a spindle with support means on which a stack of records is supported and a tone arm is to provide means for unstacking records one after the other from the spindle support means for repetitive movement of records onto the turntable without movement of the tone arm.

Another object of the invention is to provide in a phonograph having a spindle provided with a shoulder adapted to support a record stack and an actuatable member for shifting the lower-most record in the stack off the shoulder, a tone arm, and means for initiating a record change cycle the improvement which comprises, first means for actuating said record change cycle means repetitively until all the stacked records are dropped to the turntable, selectively operable second means for locating the tone arm in a rest position beyond the path of records dropping repetitively from the shoulder to the turntable, and means for selectively rendering said first and second means operable.

Further objects and advantages will become apparent from the following detailed description taken in connection with the accompanying drawings in which.

Figures 1, 5:
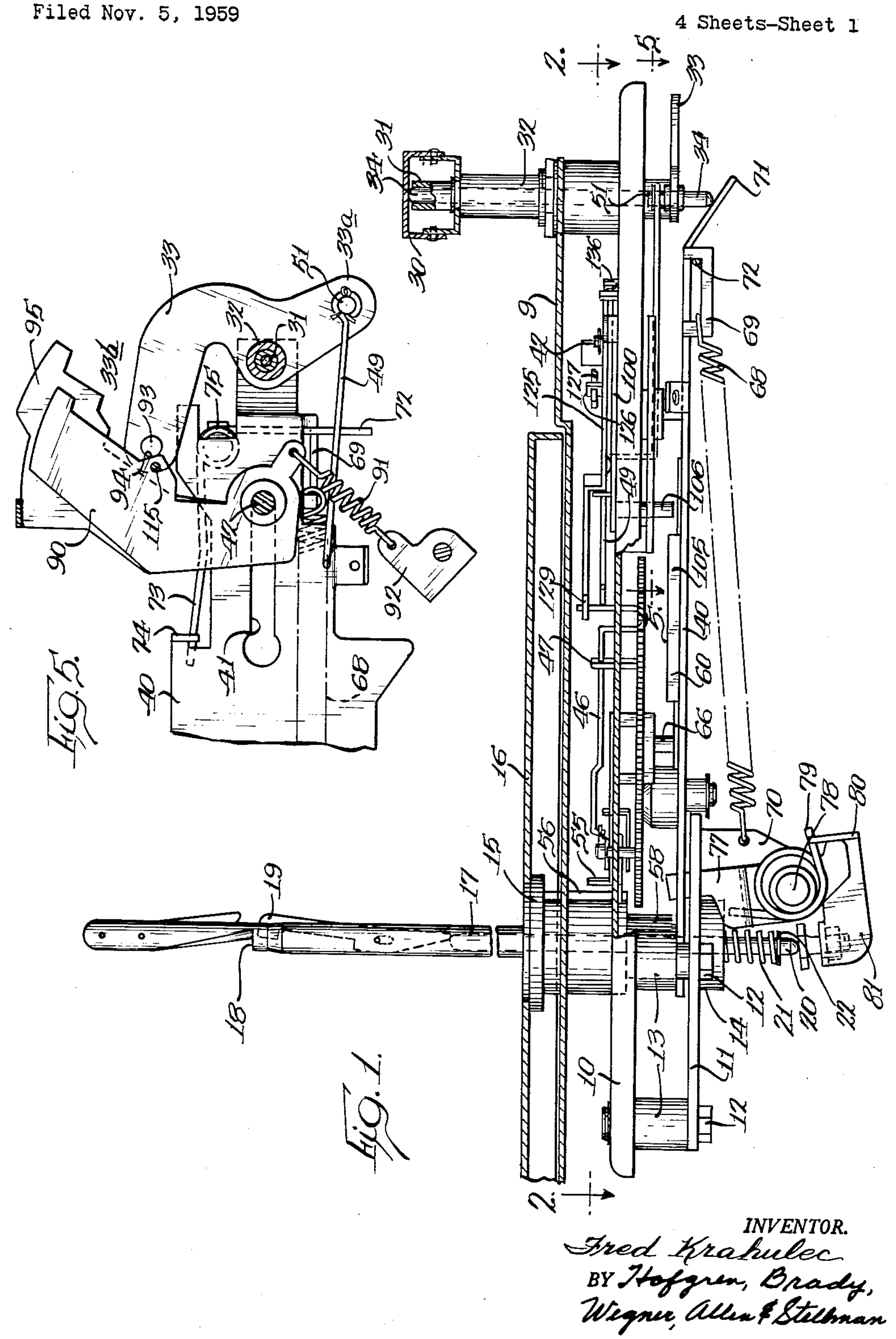
FIG. 1 is a fragmentary side elevational view of the phonograph with parts shown in section.
FIG. 5 is a fragmentary horizontal section taken along the line 5—5 in FIG. 1 and with the parts having the same position as in FIG. 4.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings the record changing phonograph has a motor board 9 carrying a frame 10 which is mountable within a casing (not shown). The frame 10 has a subframe 11 attached thereto by bolts 12 threaded into sockets 13 suitably attached to the frame. The subframe 11 has a bearing 14 rotatably mounting a collar 15 carrying the turntable 16 for rotation above the motor board 9. A spindle 17 is fixedly connected to the frame 10 and extends upwardly through the collar 15 and is adapted to have a stack of records threadably mounted thereon and supported a distance above the turntable 16 by support means comprising a shoulder 18. The spindle 17 has a record ejecting mechanism, as well known in the art, including a pivotally mounted lever 19 which has a path of movement to shift the lower-most record of a record stack from the shoulder 18 whereby the record can drop onto the turntable 16. The operation of this lever 19 is effected in a well known manner by vertical movement of an actuating rod 20 passing upwardly through the spindle 17, which is hollow, and normally urged downwardly by a spring 21 engaged between the bearing 14 and a washer 22 mounted on the pin 20.

A tone arm 30 is pivotally mounted on the frame 10 by attachment to a rotatable sleeve 31 mounted within an upstanding bearing 32 secured to the frame 10. The sleeve 31 extends beneath the frame and has a tone arm plate 33 with legs 33*a* and 33*b* attached thereto. The tone arm 30 is operated in up and down movements by vertical shift of a tone arm engaging pin 34 disposed within the sleeve and which extends beneath the bearing 32 to an exposed position whereupon vertical movement of this pin results in corresponding vertical movement of the tone arm.

Figure 2:
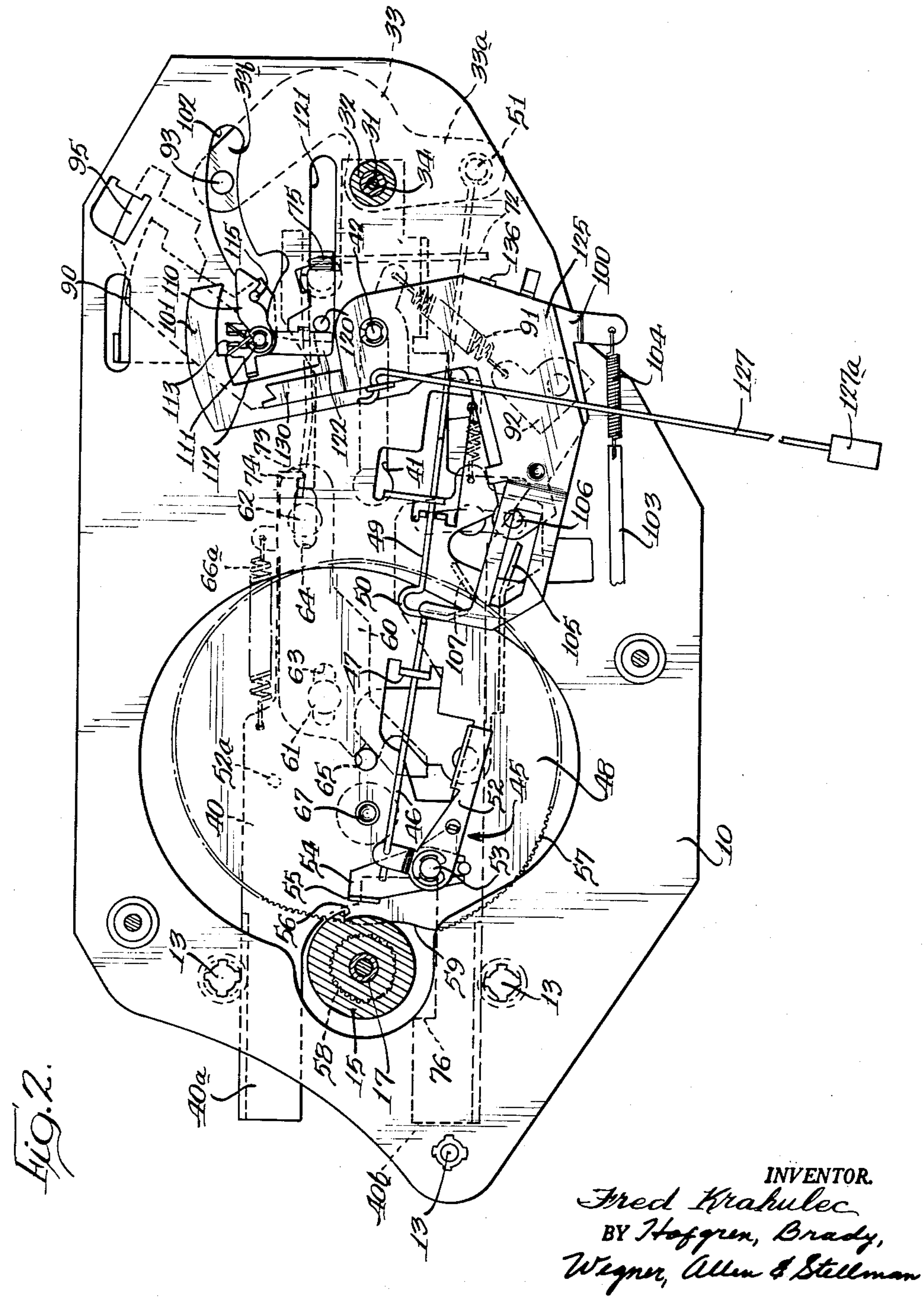
FIG. 2 is a horizontal section taken generally along the line 2—2 in FIG. 1.

A record change cycle including operation of the record ejecting lever 19 and the tone arm 30 is caused by a movable member 40 in the form of a slide plate mounted beneath the frame for reciprocable movement. The slide member 40 is guided by a slot 41 formed therein and receiving a frame pin 42 carried by the frame 10 as well as engagement of the slide legs 40*a* and 40*b* with the sockets 13, as shown in FIG. 2. The slide member 40 is shown in normal rest position in FIG. 2 and is caused to move toward the right to perform a record change cycle by a trip means indicated generally at 45 of the velocity trip type. The trip means embodies a trip wire 46 slidably mounted in an opening in an upstruck lug 47 in a wheel 48 and having an end engageable by an elongated wire 49 having one end 50 turned to a shape to engage the trip wire 46. The wire 49 has its other end attached to a pin 51 carried by the leg 33*a* of the tone arm plate 33 which pivots with the tone arm. When the tone arm 30 moves inwardly at a sufficient velocity and in a sufficient amount, the wire 49 shifts the trip wire 46 lengthwise to pivot a lever 52 pivotally mounted on a pin 53 in a counterclockwise direction as viewed in FIG. 2 to place an upturned trip end 55 of a trip member 54 into alignment with a shoulder 56 formed in the collar 15. The lever 52 and trip member 54 are in frictional engagement.

Figure 4:
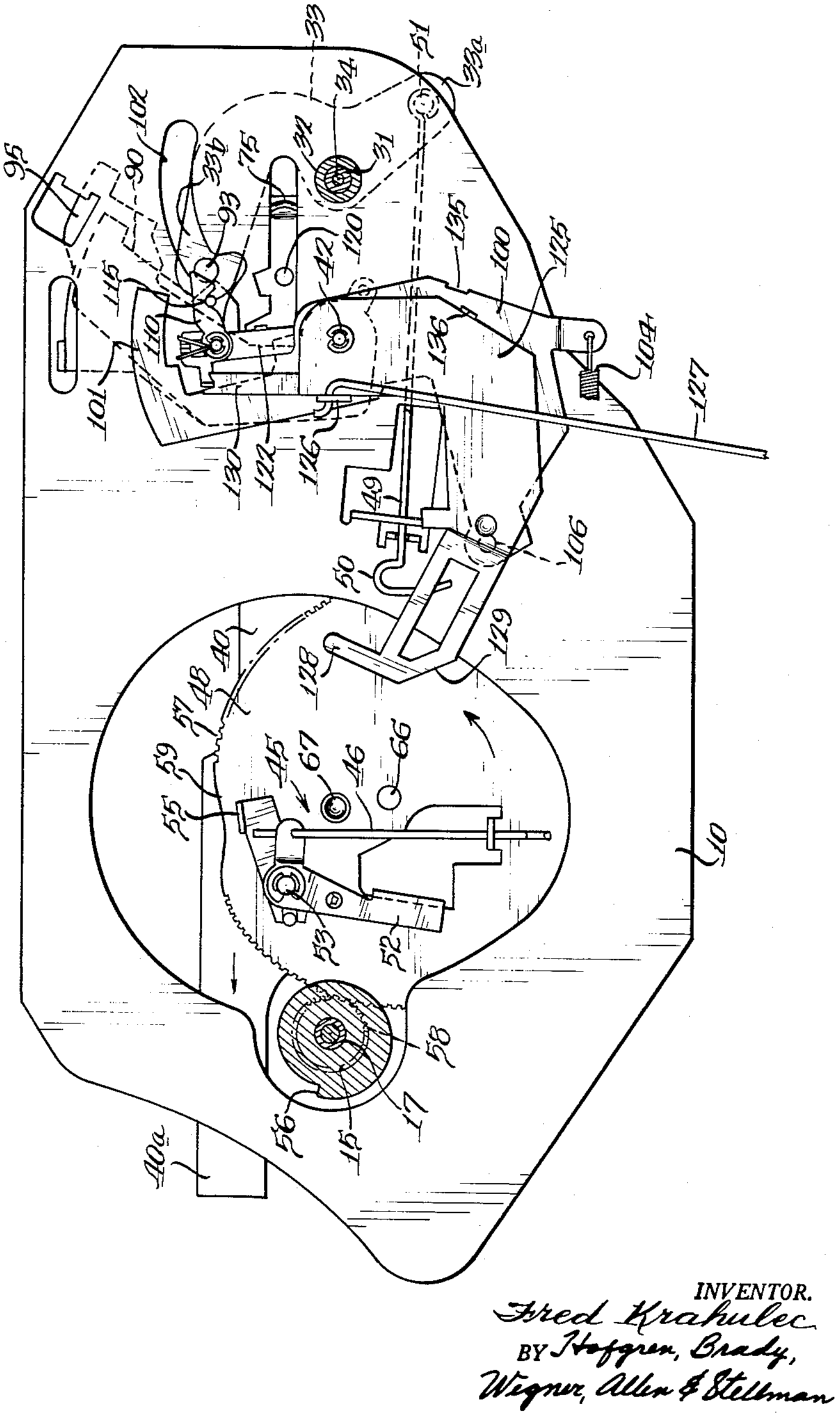
FIG. 4 is a view similar to FIGS. 2 and 3 with the parts positioned during a record change cycle but with the unstacker mechanism functioning.

With the collar 15 rotating due to rotation of the turntable 16, the rotation of the wheel 48 in a counterclockwise direction, as viewed in FIG. 2, is initiated by engagement between the trip end 55 and the shoulder 56. The rotation is continued through one revolution by engagement of peripheral teeth 57 on the wheel 48 with a serrated wheel 58 attached to and coaxial with the collar 15. The wheel 48 is provided with a slight recess 59 without teeth as shown in FIG. 4 and this part of the wheel periphery normally lies adjacent the serrated wheel 48 as shown in FIG. 2. This results in terminating the drive to the wheel 48 after one revolution. The wheel is held in a releasable position by a latch member 60 movably mounted on the slide member 40 by pins 61 and 62 on the member 40 engageable in slots 63 and 64 in the latch member 60. The latch member has a notched end 65 which engages a pin 66 extending downwardly from the wheel 48 and is held in frictional engagement therewith by a spring 66*a*. This engagement is easily released when the strip means is shifted to initiate rotation of the wheel 48.

The wheel 48 is eccentrically rotatably mounted on the slide member 40 by a pin 67 and thus rotation of the wheel 48 in one revolution results in movement of the slide member 40 toward the right as viewed in FIG. 2 and subsequent return of the slide member to its initial position with this return movement being effected by a spring 68 extending between a downturned lug 69 on the slide member 40 and a bracket 70 on the subframe 11.

The trip means are returned to initial position by a reset pin 52*a* on the slide which engages and returns lever 52.

In a record change cycle, the slide member 40 moves toward the right as viewed in FIGS. 1 and 2 from the position shown in those figures and the right-hand end of the slide member 40 carries an inclined flange 71 which engages the tone arm elevating pin 34 to cause elevation of the tone arm 30 above a record on the turntable 16. When this elevation is accomplished, a laterally extending arm 72 of a spring carried on the slide 40 engages the pin 51 extending downwardly from the tone arm plate 33 to swing the tone arm 30 outwardly beyond the path of a record dropping from the stack onto the turntable and specifically moves the tone arm plate 33 to the position shown in FIG. 3. The spring having the arm 72 has its opposite end 73 captured in a lug 74 on the slide member 40 with a central coiled portion 75 wrapped about a lug on the slide member 40.

The next step in the record change cycle is the dropping of a record from the elevated stack on the spindle 17 and this is accomplished in the final movement of the slide member 40 to the right by a notch 76 on the leg 40*b* of the slide member which engages a leg 77 of a lever pivoted on a pin 78 carried by the subframe bracket 70. A spring 79 extending between the lever leg 77 and a lug 80 on a lever 81 causes pivoting of the lever 81 in response to movement of the lever leg 77 to elevate the actuating pin 20 for the ejector lever 19.

The final part of the record changer cycle then commences upon return movement of the slide member 40 toward the left as viewed in FIGS. 1 and 2 which withdraws the spring leg 72 to permit return of the tone arm to position overlying the initial groove in a record and lowers the tone arm by withdrawal of the sloped flange 71 on the slide member 40. The return movement of the slide member also permits the spring 21 to lower the ejector actuating pin 20 and return the lever 81 to initial position along with the lever leg 77.

Return of the tone arm to playing position is caused by a lever 90 pivoted on the frame pin 42 which is urged in a clockwise direction as shown in FIG. 5 by a spring 91 attached to a frame part 92. The spring is tensioned upon outward movement of the tone arm by engagement of an upwardly extending pin 93 which extends upwardly from the tone arm plate 33 with a surface 94 on the lever 90. Thus as the force of the spring 72 urging the tone arm outwardly is released the lever 90 through the force of spring 91 causes the tone arm to return to playing position and this position is determined by a shiftable plate 95 having steps to engage the pin 93 as the tone arm moves inwardly. The steps are set at different distances to determine the total inward movement of the tone arm. The mechanism for setting the plate 95 and its coaction with a pin such as pin 93 is shown in the Siebert Patent No. 2,898,115.

The phonograph additionally includes a rest lever 100 pivoted on the frame pin 42 and having a flag member 101 which, when the lever is shifted, crosses a slot 102 in the frame through which the pin 93 carried on the tone arm plate 33 extends upwardly. This holds the tone arm in rest position when the phonograph shuts off after the playing of a last record. This rest lever 100 is actuated from a pressure arm (not shown) which rests upon the stack of records supported on the spindle 17 and which drops to a lower position when there are no records in the stack and this movement through a link 103 tensions a spring 104 tending to shift the rest lever 100. This movement cannot occur immediately because the slide 40 is to the right as viewed in FIG. 1 and a cam surface 105 blocks a pin 106 on the rest lever. After the slide 40 moves to rest position the rest lever 100 shifts. The next actuation of the slide 40 causes tone arm pin 93 to shift the flag 101 and then be locked behind it to hold the tone arm out and a cam 107 on the slide 40 then shifts the rest lever to normal position as the slide returns.

The foregoing structure is of a conventional nature in providing for automatic operation of a phonograph through a record change cycle. Frequently a person operating the phonograph will decide to stop the machine without having played all the records with the result that a stack of records is still on the spindle 17. If unplayed records are left on the spindle shoulder 18 for any extended period, they will be damaged by warping with resultant sound distortions. Mechanism is provided herein for quickly unstacking the stacked records and repetitively dropping the records onto the photograph turntable 16 whereby the records are fully supported. In order to perform this function as quickly as possible, the record change cycle is varied to continuously maintain the tone arm outwardly beyond the path of records dropping onto the turntable 16.

This mechanism includes a releasable latch 110 pivotally mounted on a pin 111 extending upwardly from the frame 10 and having a leg with an upturned end 112 and an abutment 113. The latch 110 is notched as indicated at 114 to receive a pin 115 carried on the tone arm return lever 90. In normal operation the latch 110 will be inoperative by reason of the fact that the pin 93 on the tone arm plate 33 engages the tone arm return lever surface 94 to pivot the latter member counterclockwise, as previously described. This action causes the pin 115 to engage a sloped side of the notch 114 and pivot the latch 110 counterclockwise to the position shown in FIG. 3. The latch 110 then merely floats and subsequently the tone arm return lever 90 under the urging of the spring 91 pivots clockwise to act against the pin 93 and swing the tone arm inwardly. Subsequently, the latch 110 is reset by a pin 120 on the slide member 40 extending upwardly through a slot 121 in the frame 10 as the slide member 40 moves toward the left, as viewed in the drawings. The latch is reset by this pin, as shown in FIG. 2, by the pin 120 engaging an arm 122 also pivoted on the frame pin 111 and having a shoulder 123 loosely engaging the abutment 113 on the latch 110. A spring 124 interconnects the arm 122 and the latch 110 to transmit movement from the arm 122 to the latch.

Figure 3:
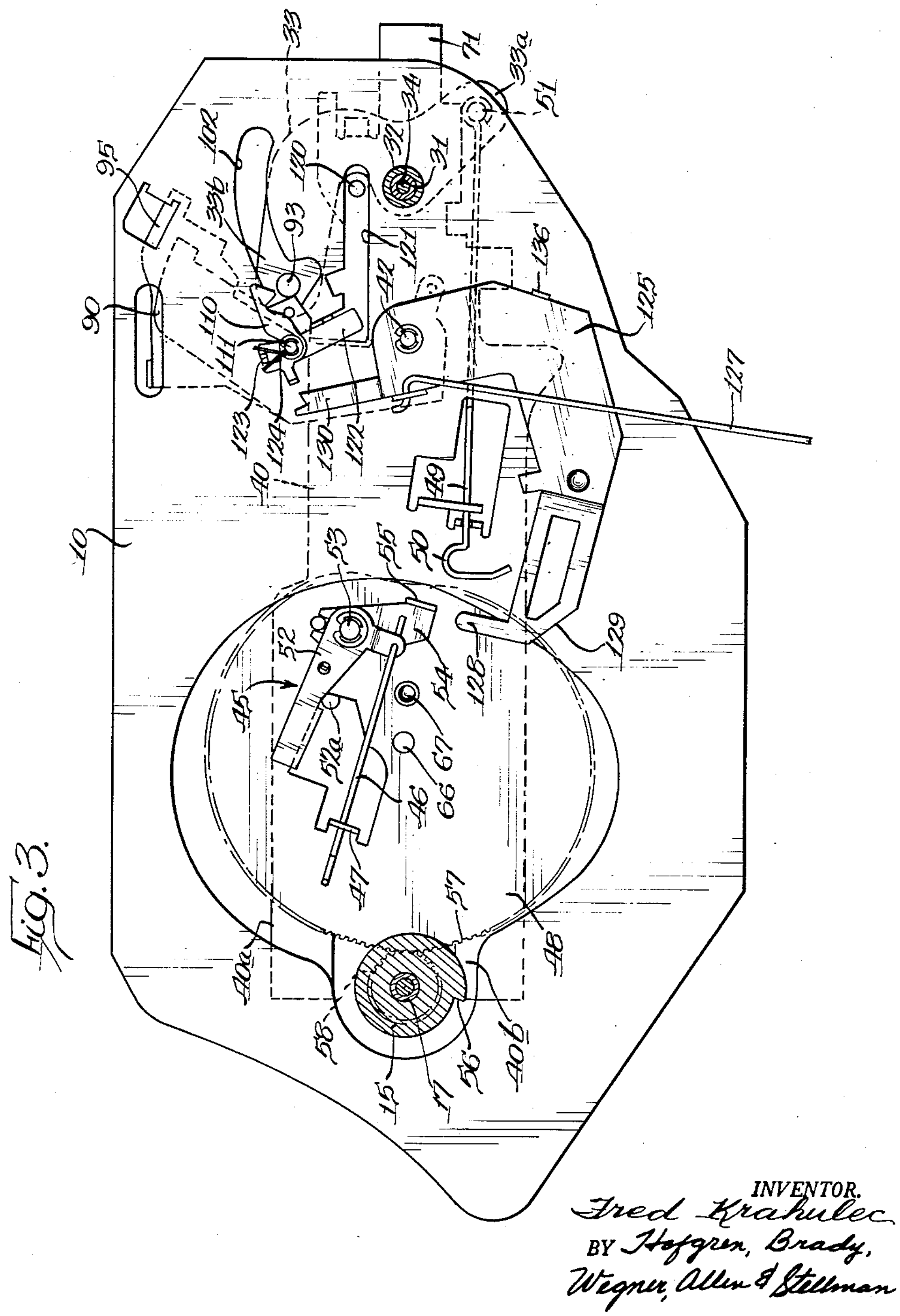
FIG. 3 is a horizontal section corresponding to FIG. 2 but with the parts shown positioned during a record change cycle with the tone arm in its outer position beyond the path of records dropping onto the turntable.

The unstacking means further includes an unstacking lever 125 pivotally mounted on the frame pin 42 and having an upstruck lug 126 which is engaged by a rod 127 extending from a manually operable knob 127*a* on the motorboard which when shifted shifts the unstacker lever 125 from the position shown in FIGS. 2 and 3 to the position shown in FIG. 4.

The unstacker lever 125 has a leg 128 with an outer surface which when the lever is shifted engages the trip wire 46 to initiate the record change cycle. A second surface 129 on the leg is positioned to again engage the trip wire 46 upon rotation of the cycle initiating wheel 48 and shift the lug 55 into position to engage the serrated wheel 58 and start another record change cycle. In addition to the foregoing means for repeating the record change cycle the necessary number of times the lever 125 has an arm 130 with a notched end which engages the lug 112 on the latch 110, as shown in FIG. 4, to prevent the normal counterclockwise pivoting of the latch 110. With the latch 110 blocked it is not possible for the pin 115 on the tone arm return plate 90 to pivot the latch 110 in a countercloskwise direction and thus this pin 115 is not freed from the latch 110. Since the pin 115 is not free the tone arm lever 90 is not free to pivot clockwise, as shown in FIG. 5, and thus the tone arm is not returned to a position overlying the turntable. It will be seen that with this structure the record change cycle is repeated so long as there are records stacked on the spindle 17 and this dropping of the records to the turntable is done quickly since the tone arm 30 need not swing in to initiate a record change cycle.

The unstacker lever 125 is returned to an inoperative position after a drop of the last record to the turntable from the stack by the rest lever 100 which pivots clockwise in a shut off operation to bring an edge 135 of the rest lever to the left of a downturned lug 136 on the unstacker lever 125. Subsequent return of the rest lever to its normal position, as previously described, which movement is in a counterclockwise direction, returns the unstacker lever 125 to its normal position by engagement between the edge 135 and the lug 136. With the rest lever and unstacker lever positioned as shown in FIG. 2, an upward push on the rod 127 as viewed in this figure results in clockwise pivoting of the unstacker lever 125. This pivoting is not prevented by engagement of lug 136 with edge 135 since the lug 126 with which the rod 127 engages is struck upwardly from the lever 125 so that the unstacker lever swings upwardly when actuated which is permitted by an extremely loose mounting of the unstacker lever 125 on the frame pin 42.

It will be seen that the tone arm return lever 90 in an unstacking operation is blocked against movement to return the tone arm 30 to a position overlying the turntable 16 and the tone arm 30 is continuously maintained in its outer position. The tone arm is balanced to remain in the position in which it is left.

I claim:

1. A phonograph having a rotatably mounted turntable with a record spindle extending upwardly therefrom and a pivotal tone arm adjacent the turntable, said spindle having means for supporting a record stack threaded thereon and means for dropping the lowermost record of the stack onto the turntable, record change cycle means including a movable member operable during said cycle, trip means responsive to completion of a record to start movement of said member, means responsive to movement of said member to swing the tone arm outwardly, actuate the record dropping means and swing the tone arm inwardly to record playing position, and manually operable means for unstacking records one after the other from the stack to the turntable and for maintaining the tone arm at rest beyond the path of the records dropping onto the turntable.

2. A phonograph as defined in claim 1 in which said trip means rotates as the member moves during the change cycle, and said unstacking means comprises a releasable latch for holding the tone arm moving means inoperative, a lever pivotally mounted on the motor board having a first surface engageable with said trip means as the lever is pivoted and a second surface engageable with said trip means during rotation thereof to initiate movement of said member for another change cycle, and a blocking arm on said lever engageable with said latch holding the latch against release to prevent inward movement of the tone arm, and means responsive to last record shut-off to restore said lever to its initial position.

3. In a phonograph having a spindle provided with a shoulder adapted to support a record stack, an actuable member for shifting the lowermost record in the stack off the shoulder onto a turntable, a tone arm, and means for initiating a record change cycle, the improvement comprising: first means for actuating said record change cycle means repetitively until all the stacked records are on the turntable; selectively operable second means for locating and maintaining the tone arm in a rest position beyond the path of records dropping repetitively from the shoulder to the turntable; and means for rendering said first and second means operable.

4. In combination: a phonograph having a turntable with an upstanding spindle having means above the turntable for supporting a record stack threaded on the spindle, a tone arm, means for initiating a record change cycle including outward movement of the tone arm, shift of the lowermost record of the stack from said support means to the turntable and inward movement of the tone arm, and means for moving the tone arm inwardly, means for unstacking records from the stack to the turntable repetitively while the tone arm is held out of the path of a record passing to the turntable comprising, a manually operable unstacker lever having an operative position in which said change cycle initiating means are repeatedly actuated and said means for moving the tone arm inwardly are blocked.

5. A phonograph having a turntable with a record spindle extending upwardly therefrom and a pivotal tone arm adjacent the turntable, said spindle having means for supporting a record stack threaded thereon, means for dropping the lowermost record of the stack onto the turntable, record change cycle means including a movable member operable during said cycle, means responsive to movement of said member to swing the tone arm outwardly, actuate the record dropping means and swing the tone arm inwardly to record playing position, and selectively operable means for unstacking records one after the other from the stack for movement to the turntable without movement of the tone arm.

6. In a phonograph having a spindle adapted to support a record stack, an actuable member for shifting the lowermost record in the stack from the stack onto a turntable, a tone arm, and means for initiating a record change cycle, the improvement comprising; first means for actuating said record change cycle means repetitively until all the stacked records are on the turntable, selectively operable second means for continuously maintaining the tone arm in a rest position beyond the path of records dropping repetitively from the shoulder to the turntable, and means for rendering said first and second means operable.

7. In combination: a phonograph having a turntable with an upstanding spindle having means for supporting a record stack threaded on the spindle, a tone arm, means for initiating a record change cycle including outward movement of the tone arm, shift of the lowermost record of the stack from said support means to the turntable and inward movement of the tone arm; means for unstacking records from the stack to the turntable repetitively without movement of the tone arm comprising an unstacker lever having an operative position in which said change cycle initiating means are repeatedly actuated.

References Cited in the file of this patent

UNITED STATES PATENTS

| | | |
|---|---|---|
| 2,616,705 | Leonard | Nov. 4, 1952 |
| 2,682,411 | Carlson | June 29, 1954 |